United States Patent [19]

Buckle et al.

[11] 4,222,998

[45] Sep. 16, 1980

[54] PRODUCTION OF BISMUTH TRICHLORIDE

[75] Inventors: Thomas G. Buckle; Andrew I. Bellingham, both of Sydney, Australia

[73] Assignee: Warman International Limited, Artarmon, Australia

[21] Appl. No.: 42,079

[22] Filed: May 24, 1979

[30] Foreign Application Priority Data

May 26, 1978 [AU] Australia .............................. PD4515

[51] Int. Cl.$^2$ ............................................ C01G 29/00
[52] U.S. Cl. .................................................. 423/491
[58] Field of Search .................. 423/88, 491, DIG. 12

[56] References Cited

U.S. PATENT DOCUMENTS 3,189,440 6/1965 Plust ..................................... 423/491

FOREIGN PATENT DOCUMENTS 765277 10/1971 Belgium .................................. 423/491

OTHER PUBLICATIONS

Mellor, *Inorganic and Theoretical Chemistry*, vol. 9, Longmans, Green and Co., 1929, pp. 626, 660–664.

Primary Examiner—Brian E. Hearn
Attorney, Agent, or Firm—Darby & Darby

[57] ABSTRACT

Bismuth trichloride is produced by reacting a molten bath of metallic bismuth and bismuth trichloride at a temperature below the boiling point of the trichloride with dry gaseous chlorine.

6 Claims, No Drawings

PRODUCTION OF BISMUTH TRICHLORIDE

Bismuth trichloride has been known for some time and is useful as a catalyst, and as an intermediate in the manufacture of bismuth salts and pharmaceuticals.

Until now bismuth trichloride (BiCl₃) has been prepared by passing chlorine gas through molten bismuth and recovering BiCl₃ by volatilization and condensation which has the disadvantage of requiring high temperatures, excessive energy, and poor chlorine utilization.

A second method of preparation is by distillation of the trichloride from a mixture of elemental bismuth and mercury (II) chloride.

Alternatively the bismuth trichloride is made in a water solution which yields a partially hydrolysed product. Time-consuming dehydration of this product gives a hydrated bismuth trichloride which must subsequently be distilled to obtain anhydrous trichloride.

Bismuth chloride can also be prepared from other bismuth salts by an exchange reaction with HCl; however, this requires first preparing the other salts and subsequently using the disadvantageous aqueous process to prepare the BiCl₃.

It has now been discovered that BiCl₃ can be prepared at lower temperatures in high yields, completely anhydrous, with no BiOCl contamination, excluding the molten bismuth and volatilization method.

The process of the present invention takes advantage of a discovery that the reaction of molten bismuth with chlorine is facilitated by the presence of bismuth trichloride. It is thought that bismuth trichloride may act as a vehicle for dissolving chlorine.

Accordingly, there is provided a process for the production of anhydrous bismuth trichloride which comprises the steps of establishing a molten bath of metallic bismuth and bismuth trichloride at a temperature below the boiling point of the trichloride and introducing dry gaseous chlorine for reaction with the bismuth until all the bismuth has reacted therewith.

In one embodiment of the invention, the process comprises the steps of establishing a molten bath of metallic bismuth and bismuth trichloride at a temperature below the boiling point of the trichloride, by establishing a molten bath of bismuth and introducing thereto dry gaseous chlorine whereby molten bismuth trichloride is produced; and continuing to introduce such gaseous chlorine into the molten bath of bismuth and bismuth trichloride until all the bismuth has reacted to form bismuth trichloride. This embodiment is preferred for a batch process.

In another embodiment of the invention, the process comprises the steps of establishing a molten bath of metallic bismuth and bismuth trichloride at a temperature below the boiling point of the trichloride by heating a mixture of metallic bismuth and bismuth trichloride to a molten condition, and introducing dry gaseous chlorine into the molten bath, the chlorine reacting with the bismuth until all the bismuth has reacted. This embodiment is preferred for a continuous process.

More specifically bismuth metal chips, or a mixture of bismuth metal chips and bismuth trichloride is heated in a closed vessel of suitable corrosion-resistant material such as borosilicate glass or graphite under an atmosphere of moisture-free inert gas. When the contents are molten dry chlorine gas is injected via a suitable corrosion-resistant tube into the molten bath. When the conversion of dissolved bismuth to the trichloride is complete, the colour of the bath changes from black to orange and chlorine is no longer consumed indicating the completion of the conversion of bismuth to bismuth trichloride. The liquid bismuth trichloride is withdrawn from the vessel and allowed to solidify in a moisture-free environment, for instance an airtight graphite container previously flushed with dry inert gas.

The process should be carried out at a temperature below the boiling point of the trichloride. As bismuth trichloride boils at a temperature of approximately 450° it is necessary that the temperature be below this temperature. It is preferred that the temperature range be between 325° C. and 400° C. Temperatures as low as 235° C., may be used for molten baths of bismuth and bismuth trichloride containing up to approximately 30 mole percent bismuth. More commonly it is carried out at about 325° C. using molten baths of bismuth and bismuth trichloride containing up to relatively high concentrations of bismuth. Upon the addition of chlorine the exothermic heat of reaction between bismuth and chlorine supplies sufficient heat to maintain the temperature at the desired level, by controlling the flow rate of chlorine gas.

The BiCl₃ prepared by the process according to the present invention can be used as an industrial chemical, a catalyst, an intermediate for other bismuth salts and as a feed stock in the (1) Grignard, (2) Ziegler, (3) Wurtz and (4) Friedel Crafts processes.

Thus the following basic reactions may be carried out:

$$2Bi + 3Cl_2 \rightarrow 2BiCl_3$$

$$BiCl_3 + 3RMgCl \rightarrow R_3Bi + 3MgCl_2 \qquad (1)$$

$$BiCl_3 + R_3Al \rightarrow R_3Bi + AlCl_3 \qquad (2)$$

$$BiCl_3 + 3RCl + 6Na \rightarrow R_3Bi + 6NaCl \qquad (3)$$

$$C_6H_6 + RCl \xrightarrow{BiCl_3} C_6H_5-R + HCl \qquad (4)$$

The following examples illustrate the process according to the present invention.

EXAMPLE 1

The chlorination process was carried out in a cylindrical glass reaction vessel with a removable cover containing three sealable orifices. One orifice accommodated a thermocouple well, while the others were for the input and output of gases.

1400 g metallic bismuth was placed in the reactor. The cover was fixed in place and the reactor was flushed with dry nitrogen gas. The reactor was heated to 300° C., at which temperature the bismuth was molten. (Melting point 271° C.).

Chlorine containing a small proportion of dry nitrogen was injected into the metal via a glass tube reaching nearly to the bottom of the reactor. The heat supply to the reactor was removed. At the chlorine flow rate used (2 moles/hr) the exothermic heat of reaction between bismuth and chlorine was sufficient to maintain the temperature in the reactor between 300° and 400° C. Virtually all of the injected chlorine reacted with the bismuth, very little being detected in the offtake gases.

After 4¾ hours the liquid in the reactor changed in colour from black, which is typical of a bath of bismuth in bismuth trichloride, to orange, the colour of pure molten bismuth trichloride, indicating that the chlorination reaction was complete. The chlorine gas flow was stopped and the reactor was flushed with nitrogen.

The molten trichloride was poured from the reactor at 300° C. into a container which was transferred to a desiccator, where the liquid solidified into crystalline bismuth trichloride. The yield was 99.8% of the theoretical yield of bismuth trichloride. Chemical analysis gave the bismuth content of the product as 66.5%±0.5%. The bismuth content of anhydrous bismuth trichloride is 66.3%.

EXAMPLE 2

The same procedure as Example 1 followed until the chlorination reaction was complete. At this point 200 g bismuth metal chips were introduced to the reactor. The bismuth dissolved rapidly and completely to give a black bath.

Chlorination was continued until the solution once again turned orange, signifying complete conversion of the dissolved metal into bismuth trichloride. Once again, virtually all the injected chlorine was consumed by the solution up to the time of complete conversion. After flushing the reactor with nitrogen the liquid bismuth trichloride was dealt with as described in the first example.

The yield of trichloride was 99.5% of the theoretical yield.

The foregoing examples relate only to two specific embodiments of the invention, but it must be understood from the general description that further modifications can be made within the scope of the invention.

We claim:

1. A process for the production of anhydrous bismuth trichloride which comprises the steps of establishing a molten bath of metallic bismuth and bismuth trichloride at a temperature below the boiling point of the trichloride and introducing dry gaseous chlorine for reaction with the bismuth until all the bismuth has reacted therewith.

2. A process according to claim 1 wherein the step of establishing a molten bath of metallic bismuth and bismuth trichloride at a temperature below the boiling point of trichloride, comprises establishing a molten bath of bismuth and introducing thereto dry gaseous chlorine whereby molten bismuth trichloride is produced in the molten bath of bismuth.

3. A process according to claim 1 wherein the step of establishing a molten bath of metallic bismuth and bismuth trichloride at a temperature below the boiling point of the trichloride, comprises heating a mixture of metallic bismuth and bismuth trichloride to a molten condition.

4. A process according to any one of claims 1 to 3 wherein the temperature of the molten bath is between 325° C. and 400° C.

5. A process according to any one of claims 1 to 3 wherein the bismuth trichloride acts as a vehicle for dissolving chlorine.

6. A process according to any one of claims 1 to 3 wherein the temperature of the molten bath is between 325° C. and 400° C. and the bismuth trichloride acts as a vehicle for dissolving chlorine.

* * * * *